United States Patent
Wan

(10) Patent No.: US 12,155,833 B2
(45) Date of Patent: Nov. 26, 2024

(54) METHOD AND APPARATUS FOR ENCODING VIDEO, AND STORAGE MEDIUM

(71) Applicant: BEIJING BAIDU NETCOM SCIENCE TECHNOLOGY CO., LTD., Beijing (CN)

(72) Inventor: Zhao Wan, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 162 days.

(21) Appl. No.: 17/807,137

(22) Filed: Jun. 15, 2022

(65) Prior Publication Data

US 2023/0050250 A1 Feb. 16, 2023

(30) Foreign Application Priority Data

Aug. 12, 2021 (CN) .......................... 202110924604.5

(51) Int. Cl.
*H04N 19/124* (2014.01)
*H04N 19/146* (2014.01)
*H04N 19/172* (2014.01)

(52) U.S. Cl.
CPC ......... *H04N 19/124* (2014.11); *H04N 19/146* (2014.11); *H04N 19/172* (2014.11)

(58) Field of Classification Search
CPC ... H04N 19/124; H04N 19/146; H04N 19/172
See application file for complete search history.

(56) References Cited

U.S. PATENT DOCUMENTS

| 7,496,142 B2 | 2/2009 | Hui et al. | |
| 2005/0058198 A1* | 3/2005 | Zhao | H04N 19/14 |
| | | | 375/E7.181 |
| 2015/0237346 A1* | 8/2015 | Symes | H04N 19/124 |
| | | | 375/240.03 |

FOREIGN PATENT DOCUMENTS

| CN | 103841418 A | 6/2014 |
| CN | 105376568 A | 3/2016 |

(Continued)

OTHER PUBLICATIONS

"Chinese Search Report, The State Intellectual Property Office of People's Republic of China, issued to CN Application No. 202110924604.5 on Apr. 8, 2022, 1 page."

(Continued)

*Primary Examiner* — Kyle M Lotfi
(74) *Attorney, Agent, or Firm* — Hunton Andrews Kurth LLP

(57) ABSTRACT

Provided are a method and apparatus for encoding a video, and a storage medium, which relate to the field of cloud computing, in particular to the video encoding technology. The method includes: acquiring an actual encoding data amount and an encoding frame number of an encoder in a historical time period; calculating a desired encoding data amount in the historical time period according to a code rate of the encoder and the encoding frame number; and comparing the actual encoding data amount and the desired encoding data amount, and adjusting a quantization parameter of the encoder according to a comparison result to instruct the encoder to continue encoding using the adjusted quantization parameter.

14 Claims, 5 Drawing Sheets

(56) References Cited

FOREIGN PATENT DOCUMENTS

EP 2978219 A1 1/2016
JP 2007089035 A 4/2007

OTHER PUBLICATIONS

"First Chinese Office Action, The State Intellectual Property Office of People's Republic of China, issued to CN Application No. 202110924604.5 on Apr. 15, 2022, 10 pages."
European Patent Office, Extended European Search Report issued to EP application No. 22174327.1 on Nov. 8, 2022, 9 pages.

\* cited by examiner

METHOD AND APPARATUS FOR ENCODING VIDEO, AND STORAGE MEDIUM

CROSS-REFERENCE TO RELATED APPLICATION

This disclosure claims the priority to Chinese Patent Application No. CN202110924604.5, filed on Aug. 12, 2021, the disclosure of which is incorporated herein by reference in its entirety.

TECHNICAL FIELD

The present disclosure relates to the field of cloud computing, in particular, to a method and apparatus for encoding a video, an electronic device, and a storage medium.

BACKGROUND

The amount of video image data is large and thus usually needs to be compressed. The compressed data is called a video code stream, and the video code stream is transmitted to a user equipment through a wired or wireless network, then decoded and watched.

The size of the compressed video frame is related to parameters selected by an encoder in the encoding process, where the quantization parameter (QP) is used for controlling the amount of data lost in the lossy quantization process. Generally, the smaller the quantization parameter is, the clearer the picture becomes, and the larger the quantization parameter is, the more blurred the picture becomes.

SUMMARY

The present disclosure provides a method and apparatus for encoding a video, and a storage medium.

According to an aspect of the present disclosure, a method for encoding a video is provided. The method includes the steps described below.

An actual encoding data amount and an encoding frame number of an encoder in a historical time period are acquired.

A desired encoding data amount in the historical time period is calculated according to a code rate of the encoder and the encoding frame number.

The actual encoding data amount is compared with the desired encoding data amount, and a quantization parameter of the encoder is adjusted according to a comparison result to instruct the encoder to continue encoding using the adjusted quantization parameter.

According to another aspect of the present disclosure, an apparatus for encoding a video is provided. The apparatus includes at least one processor; and a memory communicatively connected to the at least one processor; wherein the memory stores instructions executable by the at least one processor, and the instructions are executed by the at least one processor to cause the at least one processor to perform steps in the following modules: a historical encoding data acquisition module, a desired encoding data calculation module and a quantization parameter adjustment module.

The historical encoding data acquisition module is configured to acquire an actual encoding data amount and an encoding frame number of an encoder in a historical time period.

The desired encoding data calculation module is configured to calculate a desired encoding data amount in the historical time period according to a code rate of the encoder and the encoding frame number.

The quantization parameter adjustment module is configured to compare the actual encoding data amount with the desired encoding data amount, and adjust a quantization parameter of the encoder according to a comparison result to instruct the encoder to continue encoding using the adjusted quantization parameter.

According to an aspect of the present disclosure, a non-transitory computer-readable storage medium storing a computer instruction is provided, where the computer instruction is used for enabling a computer to perform the method for encoding a video provided by any embodiment of the present disclosure.

The embodiments of the present disclosure can improve the stability of traffic required for video encoding.

It is to be understood that the content described herein is not intended to identify key or important features of embodiments of the present disclosure nor is it intended to limit the scope of the present disclosure. Other features of the present disclosure will be readily understood through the following description.

BRIEF DESCRIPTION OF DRAWINGS

The drawings are for a better understanding of the present disclosure and do not constitute a limitation of the present disclosure. In the drawings.

DETAILED DESCRIPTION

Example embodiments of the present disclosure are described below in conjunction with the drawings, including various details of the embodiments of the present disclosure for the purpose of understanding, and should be considered exemplary only. Accordingly, those of ordinary skill in the art will appreciate that various changes and modifications may be made to the embodiments described herein without departing from the scope and spirit of the present disclosure. For the sake of clarity and conciseness, the description of well-known functions and structures is omitted in the following description.

Figure 1:
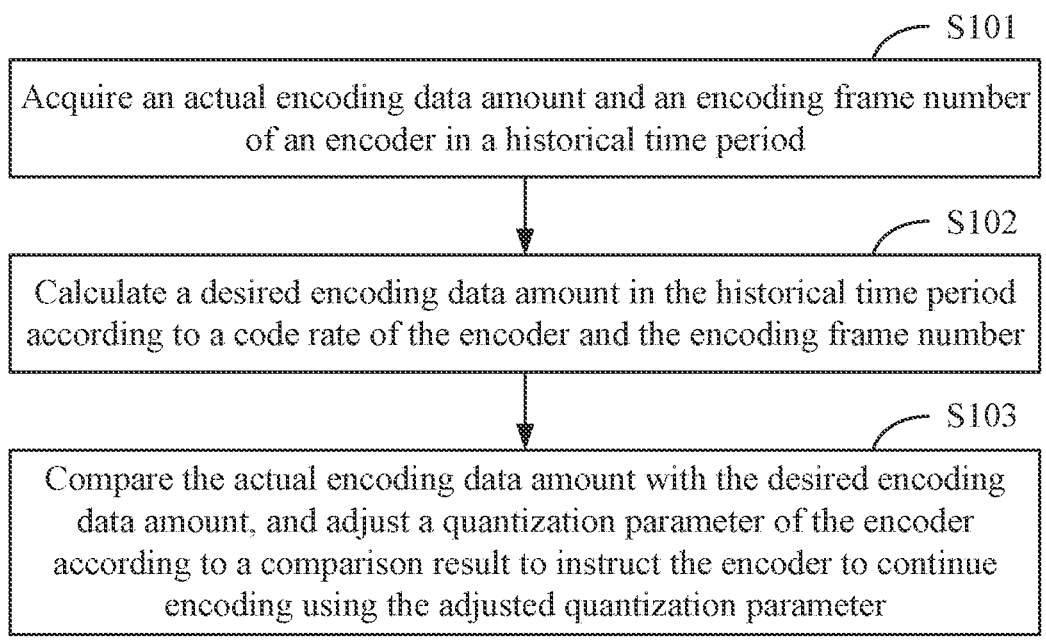
FIG. 1 is a flowchart of a method for encoding a video according to an embodiment of the present disclosure.

FIG. 1 is a flowchart of a method for encoding a video according to an embodiment of the present disclosure. This embodiment can be applied to a case where the quantization parameter of an encoder is continuously adjusted in the video encoding process. The method of this embodiment can be executed by an apparatus for encoding a video, and the apparatus can be implemented by software and/or hardware and may be configured in an electronic device having a certain data operation capability. The electronic device can be a client device or a server device, and the client device is, for example, a mobile phone, a tablet computer, a vehicle terminal, a desktop computer and the like.

In S101, an actual encoding data amount and an encoding frame number of an encoder in a historical time period are acquired.

The video may consist of a series of video frames and is encoded by an encoder. In the encoding process, usually successive video frames are sequentially backward encoded from the first video frame according to the time sequence. The encoder may be pre-configured with a preset fixed encoding parameter, and the first video frame may be encoded by adopting the fixed encoding parameter; and a video frame after the first video frame may be encoded according to an adjusted quantization parameter obtained by the method for encoding a video provided by the embodiment of the present disclosure. The currently encoded video frame is a video frame after the first video frame.

The historical time period refers to a time period before the currently encoded video frame is encoded and may be a time period between the time when the first video frame is encoded and the current time or a sub-time period of the above-mentioned time period, that is, a time period between times when any two video frames are encoded, where the two video frames are selected from video frames from the first video frame to the currently encoded video frame. The actual encoding data amount may refer to an average data amount of one video frame encoded by an encoder in a historical time period. The data amount refers to the number of bytes included in one video frame. The encoding frame number refers to the number of encoded video frames.

In addition, the quantization parameter may be adjusted periodically, for example, the period duration is 50 ms, and the historical time period is 50 ms before the current time.

In S102, a desired encoding data amount in the historical time period is calculated according to a code rate of the encoder and the encoding frame number.

The code rate of the encoder is used for representing a binary bit rate of the encoder and representing the number of bits for video encoding per unit time. The desired encoding data amount may refer to an average data amount of one video frame encoded by the encoder at the code rate in the historical time period. According to the code rate and the duration of the historical time period, the number of bits obtained after the encoder performs encoding at the code rate in the historical time period can be calculated. An average data amount of one video frame encoded by the encoder at the code rate in the historical time period can be calculated according to the encoding frame number and the code rate, and the calculated data amount is determined to as the desired encoding data amount.

In S103, the actual encoding data amount is compared with the desired encoding data amount, and a quantization parameter of the encoder is adjusted according to a comparison result to instruct the encoder to continue encoding using the adjusted quantization parameter.

The actual encoding data amount refers to the data amount of one video frame actually encoded by the encoder, and the desired encoding data amount refers to the desired data amount of one video frame to be encoded by the encoder at a preset code rate. The quantization parameter is used for controlling the data amount of an encoded video frame. In practice, the desired encoding data amount represents a quantization parameter with a constant code rate, and the actual encoding data amount represents a current quantization parameter of the encoder. The comparison result is used for determining the difference between the quantization parameter with the constant code rate and the current quantization parameter.

Because of the different complexity or richness of a video at different times, the data amount of video frames changes. For example, if the video is a game video, the complexity and richness of images displayed by the game video change with time, and when the game video switches from a desert scene to an urban scene, the data amount of video frames changes from small to large. Since the data volume of video frames changes, especially the data volume of video frames becomes very large, the encoder will change the code rate to adapt to the encoding of video frames having a large data amount. This embodiment of the present disclosure is applied to an application scenario where the code rate is kept constant, so it is necessary to control the data amount of one video frame encoded by the encoder.

The quantization parameter of the encoder is adjusted, and the encoding is performed using the adjusted quantization parameter, so that the actual encoding data amount approaches the desired encoding data amount to keep the code rate constant, thereby keeping the bandwidth and the flow constant.

In the related art, the complexity or richness of adjacent video frames in the video is different, which makes the pixels of different video frames different. In particular, when the encoder encodes complex video frames or colorful video frames, the code rate increases, which in turn leads to the occupation of more bandwidth resources and the need to consume more traffic.

According to the solution of the present disclosure, the quantization parameter of the encoder is adjusted according to the actual encoding data amount, the encoding frame number and the code rate of the encoder in the historical time period to control the encoding data amount of video frames, thereby keeping the encoding data amount and the code rate constant, improving the stability of the bandwidth occupied for video encoding and improving the traffic stability of video encoding. Moreover, the quantization parameter is adjusted in real time in the encoding process, thereby improving the stability of video encoding, reducing the labor cost and improving the efficiency of controlling constancy of the rate.

Figure 2:
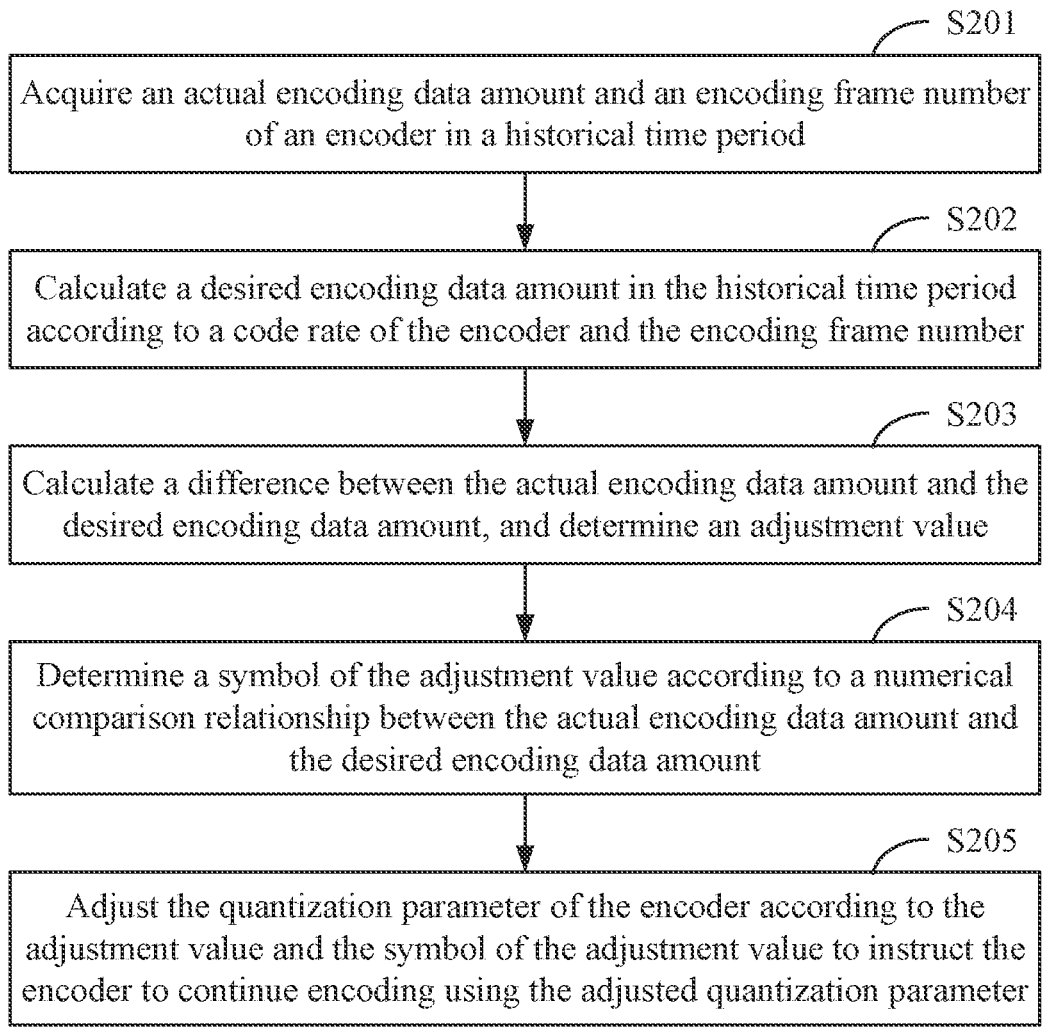
FIG. 2 is a flowchart of another method for encoding a video according to an embodiment of the present disclosure.

FIG. 2 is a flowchart of another method for encoding a video according to an embodiment of the present disclosure. This embodiment is expanded on the basis of the preceding solution and may be combined with various optional embodiments described above. The step where the actual encoding data amount is compared with the desired encoding data amount, and the quantization parameter of the encoder is adjusted according to the comparison result includes: a difference between the actual encoding data amount and the desired encoding data amount is calculated, and an adjustment value is determined; a symbol of the adjustment value is determined according to a numerical comparison relationship between the actual encoding data amount and the desired encoding data amount; and the quantization parameter of the encoder is adjusted according to the adjustment value and the symbol of the adjustment value.

In S201, an actual encoding data amount and an encoding frame number of an encoder in a historical time period are acquired.

In S202, a desired encoding data amount in the historical time period is calculated according to a code rate of the encoder and the encoding frame number.

In S203, a difference between the actual encoding data amount and the desired encoding data amount is calculated, and an adjustment value is determined.

The difference between the actual encoding data amount and the desired encoding data amount indicates the difference degree between the actual data amount of one video frame and the desired data amount of the video frame in the encoding process. The adjustment value refers to the adjustment amount of an attribute value of the quantization parameter. There is a mapping relationship between the difference degree and the value of quantization parameter. The difference may be mapped to the value of the quantization parameter and may be determined as the adjustment value of the quantization parameter.

Optionally, the step where the adjustment value is determined includes: a first ratio between the difference and the desired encoding data amount is calculated; a second ratio between the first ratio and a preset standard divisor is calculated and rounded to obtain a target integer; and the adjustment value is determined according to the target integer.

The first ratio refers to the proportion of the difference in the desired encoding data amount. The difference is divided by the desired encoding data amount for normalizing differences calculated in different historical time periods. The standard divisor is used for correcting the adjustment value to improve the fault tolerance of the adjustment value. The second ratio is used for determining first ratios within a range determined by the standard divisor as the same first ratio. The rounding may be downward rounding. Generally, the difference between the actual encoding data amount and the desired encoding data amount is small, so it is considered that the data amount of the video frame obtained after the video frame is actually encoded makes the code rate change slightly, which can be understood that the code rate is constant at this point. As a result, the configuration of the standard divisor may allow not to perform the quantization parameter adjustment on the actual encoding data amount that causes the slightly change of the code rate. The desired encoding data amount and the actual encoding data amount are statistically obtained mean values, there is a calculation error, the first ratio is divided by the standard divisor and the quotient is rounded, and similar first ratios correspond to the same adjustment value, that is, the similar differences correspond to the same adjustment value, thereby correcting the error and improving the fault tolerance of the system for calculating the adjustment value.

The target integer is used for determining the adjustment value, for example, the target integer may be determined as the adjustment value.

In a specific example, the standard divisor is 25%. For example, when the ratio is less than 25%, the target integer is 0, the adjustment value is 0, and no adjustment is made to the quantization parameter. When the ratio is less than 30%, the target integer is 1, the adjustment value is 1, and the quantization parameter increases or decreases by 1. When the ratio is 50%, the target integer is 2, the adjustment value is 2, the quantization parameter increases or decreases by 2, and so on.

The ratio between the difference and the desired encoding data amount is calculated and is divided by the standard divisor, and the quotient is rounded, thereby normalizing and correcting the adjustment parameter and improving the accuracy of the adjustment value.

Optionally, the step where the adjustment value is determined according to the target integer includes: the first ratio is compared with a preset standard ratio, and a corresponding adjustment coefficient is determined; and the adjustment value is determined according to the adjustment coefficient and the target integer.

In some dynamic scenarios, the data amount of the video frame will fluctuate greatly. Such dynamic scenarios, for example, may be scenarios of playing games or watching videos. If the quantization parameter is increased or decreased according to the target integer, the adjustment is too slow. Therefore, an adjustment coefficient is added on the basis of the target integer. The increase of the adjustment value for the quantization parameter can speed up the adjustment of the quantization parameter.

The adjustment coefficient is used for adjusting the target integer and increasing the adjustment value to speed up the adjustment of the quantization parameter. The standard ratio is used for determining the adjustment coefficient, in particular for detecting the fluctuation of the data amount of the video frame. When the first ratio is greater than or equal to the standard ratio, it is determined that there is an application scenario in which the data amount of the video frame fluctuates greatly. At this point, the target integer is increased according to the adjustment coefficient, and the increased target integer is determined as the adjustment value. For example, the adjustment value is the sum or product of the adjustment coefficient and the target integer; or, the adjustment value is the power of the adjustment coefficient of the target integer. When the first ratio is less than the standard ratio, it is determined that there is an application scenario in which the data amount of the video frame fluctuates little. At this point, the adjustment coefficient is 1, the target integer is not adjusted according to the adjustment coefficient, and the target integer is determined as the adjustment value.

In a specific example, the standard ratio is 150%. When the first ratio is 175%, the first ratio is greater than the standard ratio, and correspondingly, the adjustment coefficient is 2. The target integer is calculated as 150%/25%=7, and the adjustment value is calculated as 7*2=14. In another example, when the first ratio is 125%, the first ratio is less than the standard ratio, and correspondingly, the adjustment coefficient is 1. The target integer is calculated as 125%/25%=5, and the adjustment value is calculated as 5*1=5.

The adjustment coefficient is introduced on the basis of the target integer, and when the data amount of the video frame fluctuates greatly, the target integer can be increased and determined as the adjustment value, so that the adjustment of the quantization parameter can be sped up and the data amount of the video frame can be stabilized faster, thereby accurately keeping the code rate and traffic constant.

In S204, a symbol of the adjustment value is determined according to a numerical comparison relationship between the actual encoding data amount and the desired encoding data amount.

The numerical comparison relationship between the actual encoding data amount and the desired encoding data amount is used for determining the magnitude relationship between the actual encoding data amount and the desired encoding data amount. The symbol of the adjustment value includes positive or negative, that is, the adjustment direction of the quantization parameter includes increase or decrease. The magnitude relationship actually corresponds to the adjustment direction of the quantization parameter, that is, the magnitude relationship corresponds to the symbol of the adjustment value. For example, if the actual encoding data amount is greater than the desired encoding data amount, the quantization parameter may be increased, that is, the symbol is positive, to increase the lost data amount, thereby reducing the data amount of the subsequent encoded video frame; and if the actual encoding data amount is less than the desired encoding data amount, the quantization parameter may be reduced, that is, the symbol is negative, to reduce the lost data amount, thereby increasing the data amount of the subsequent encoded video frame. In addition, if the actual encoding data amount is equal to the desired encoding data amount, the adjustment value of the quantization parameter is 0, the symbol may not be determined, that is, the quantization parameter does not need to be adjusted, or the adjusted quantization parameter is the same as the quantization parameter that is not adjusted.

In S205, the quantization parameter of the encoder is adjusted according to the adjustment value and the symbol of the adjustment value to instruct the encoder to continue encoding using the adjusted quantization parameter.

According to the adjustment value and the symbol, the quantization parameter may be increased or decreased by the adjustment value to accurately adjust the quantization parameter.

According to the solution of the present disclosure, the adjustment value of the quantization parameter is adjusted according to the difference between the actual encoding data amount and the desired encoding data amount, and the symbol of the adjustment parameter is determined according to the numerical comparison relationship between the actual encoding data amount and the desired encoding data amount, so that the direction and specific value for adjusting the quantization parameter can be accurately determined, the quantization parameter can be accurately modified, and the data amount of the encoded video frame can be flexibly controlled, thereby accurately achieving the constant code rate and traffic.

Figure 3:
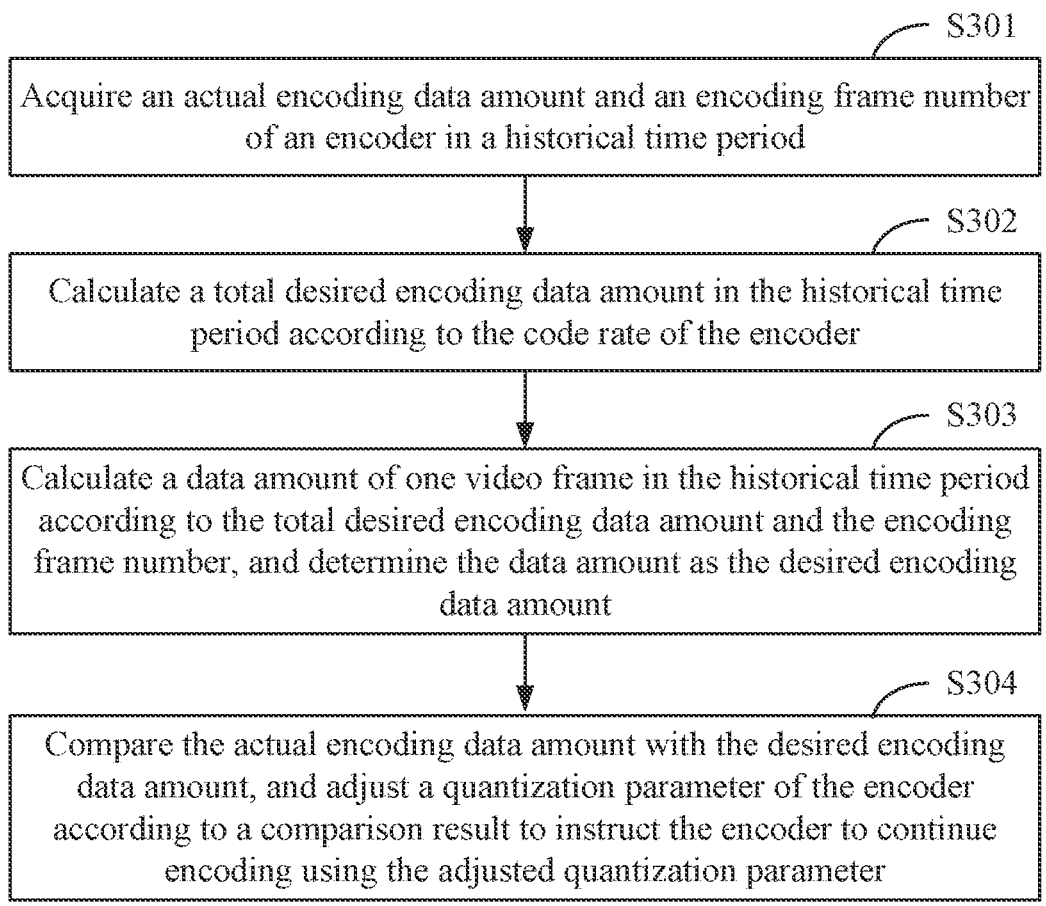
FIG. 3 is a flowchart of another method for encoding a video according to an embodiment of the present disclosure.

FIG. 3 is a flowchart of another method for encoding a video according to an embodiment of the present disclosure. This embodiment is expanded on the basis of the preceding solutions and may be combined with various optional embodiments described above. The step where the desired encoding data amount in the historical time period is calculated according to the code rate of the encoder and the encoding frame number includes: a total desired encoding data amount in the historical time period is calculated according to the code rate of the encoder; and a data amount of each video frame in the historical time period is calculated according to the total desired encoding data amount and the encoding frame number, and the data amount is determined as the desired encoding data amount.

In S301, an actual encoding data amount and an encoding frame number of an encoder in a historical time period are acquired.

Optionally, the step where the actual encoding data amount of the encoder in a historical time period is acquired includes: the actual encoding data amount of the encoder for a video stream in the historical time period is acquired.

This embodiment of the present disclosure is applied to the process where the encoder encodes the video stream. Optionally, this embodiment of the present disclosure is applied to the process where the encoder encodes the video stream of a cloud phone. That is, the method for encoding a video provided by this embodiment of the present disclosure is particularly applied to the cloud phone. The cloud phone is based on a cloud-based software-defined simulation mobile phone service so that some application scenarios of physical mobile phones can run intelligently through the cloud, which is equivalent to achieving the functions of mobile phones in the cloud.

The video stream is encoded and the code rate is kept constant so that the quality of video images of the video stream can be changed and the traffic can be kept constant, thereby saving the traffic for the video stream transmission.

In S302, a total desired encoding data amount in the historical time period is calculated according to the code rate of the encoder.

According to the code rate, the total data amount of the video frame encoded by the encoder within 1 second can be calculated. The total desired encoding data amount is the total data amount of video frames encoded within the duration of the historical time period.

In a specific example, the code rate is 4096. Under the A data format, the total data amount of video frames encoded by the encoder in one second is 4096*1024 bits. If the total data amount is converted into bytes, the total desired encoding data amount is 4096*1024/8=524288 bytes, which is about 524k bytes. The historical time period is 50 ms, and the total desired encoding data amount is 524k/1000*50=26214 bytes.

In S303, a data amount of one video frame in the historical time period is calculated according to the total desired encoding data amount and the encoding frame number, and the data amount is determined as the desired encoding data amount.

The total desired encoding data amount is divided by the encoding frame number to obtain the average data amount of one video frame, and the obtained data amount is determined as the desired encoding data amount.

As described above, the video frame number is 10, and the desired encoding data amount is 26214/100=262 bytes. It is to be noted that the number of bytes may also be converted into the number of bits, which can be set according to the needs.

In S304, the actual encoding data amount is compared with the desired encoding data amount, and a quantization parameter of the encoder is adjusted according to a comparison result to instruct the encoder to continue encoding using the adjusted quantization parameter.

Optionally, the data amount is the frame size.

The data amount is the frame size of a video frame during the process where the encoder encodes a video into a video of a certain data format. The frame size refers to the number of bits included in one video frame under the data format and is usually the product of the number of pixels included in the video frame and the ratio of the number of bits to the number of pixels under the data format. Under of different data formats, corresponding relationships between the number of bits and the number of pixels are different.

The data amount is configured as the frame size so that the size of the video frame can be controlled at the bit level, thereby increasing the flexibility and accuracy of the control of the quantization parameter.

According to the solution of the present disclosure, the total desired encoding data amount in the historical time period is calculated according to the code rate, the data amount of one video frame encoded at the code rate is calculated according to the actual encoding frame number to calculate the desired encoding data amount for the encoding at the code rate, and the quantization parameter is adjusted according to the desired encoding data amount, so that the encoding mode based on the adjusted quantization parameter can keep the code rate constant.

Figure 4:
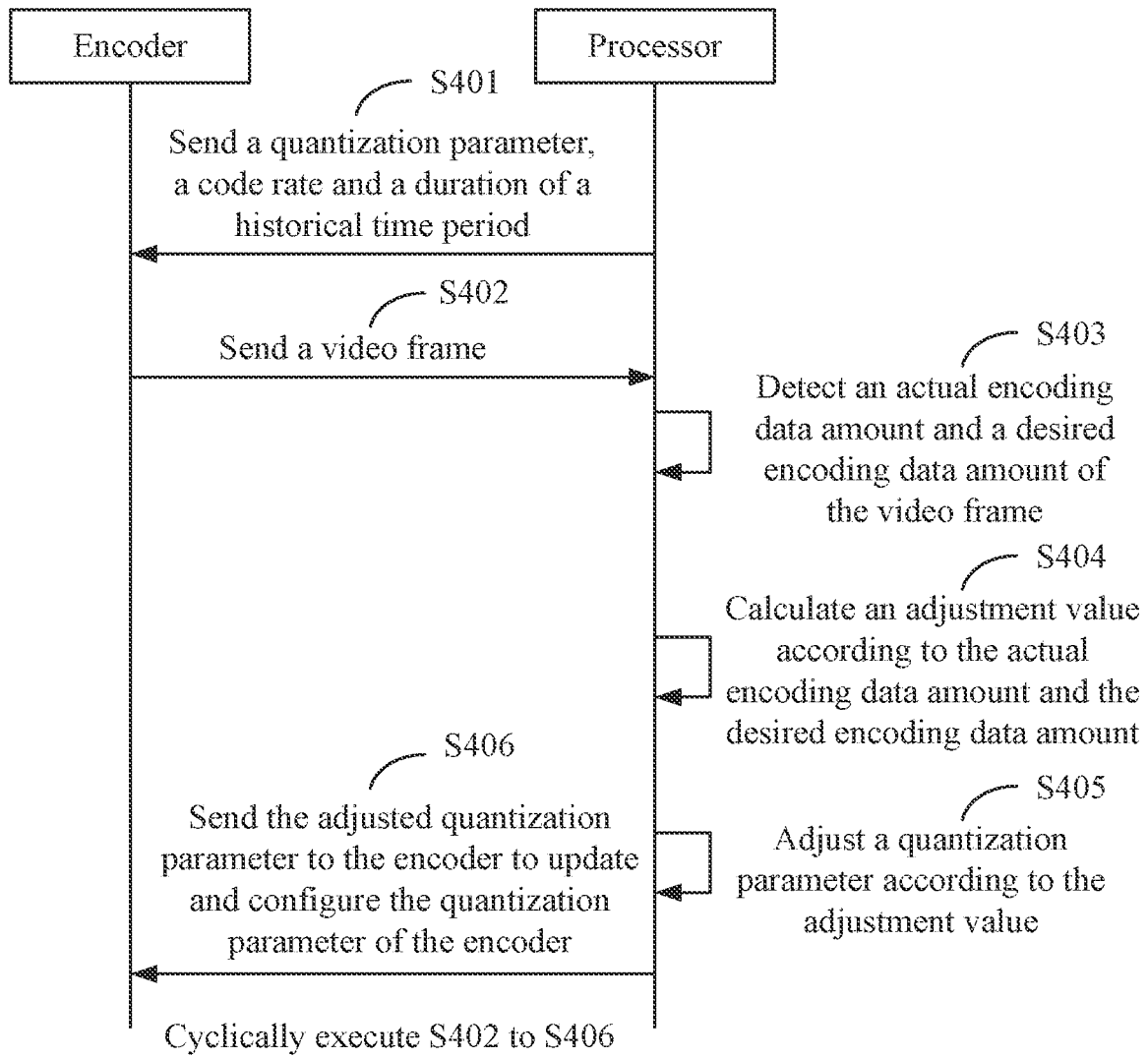
FIG. 4 is a signaling diagram of a processor and an encoder according to an embodiment of the present disclosure.

FIG. 4 is a signaling diagram of an encoder and a processor according to an embodiment of the present disclosure.

In S401, a processor sends a quantization parameter, a code rate and the duration of a historical time period to an encoder to configure a quantization parameter of the encoder, the code rate and the duration of the historical time period.

The processor is used for implementing the method for encoding a video provided by this embodiment of the present disclosure, and the encoder is used for implementing the encoding of a video stream.

In S402, the encoder sends a video frame to the processor.

In S403, the processor detects an actual encoding data amount and a desired encoding data amount of the video frame.

In S404, the processor calculates an adjustment value according to the actual encoding data amount and the desired encoding data amount.

In S405, the processor adjusts a quantization parameter according to the adjustment value.

In S406, the processor sends the adjusted quantization parameter to the encoder to update and configure the quantization parameter of the encoder.

S402 to S406 are cyclically executed at intervals of the duration of the historical time period.

The quantization parameter is adjusted through the encoding data amounts, thereby controlling the code rate to be kept constant, controlling the traffic constant and saving the traffic.

Figure 5:
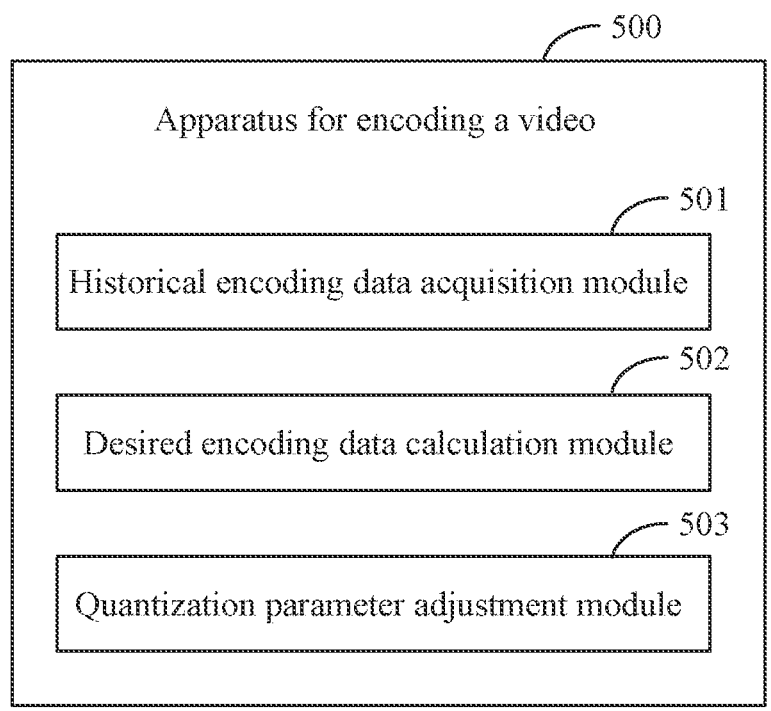
FIG. 5 is a schematic diagram of an apparatus for encoding a video according to an embodiment of the present disclosure.

According to an embodiment of the present disclosure, FIG. 5 is a flowchart of a method for encoding a video according to an embodiment of the present disclosure. This embodiment is applied to a case where the quantization parameter of an encoder is continuously adjusted in the video encoding process. The apparatus is implemented by software and/or hardware and may be configured in an electronic device having a certain data operation capability.

FIG. 5 is a schematic diagram of an apparatus for encoding a video according to an embodiment of the present disclosure. As shown in FIG. 5, the apparatus 500 for encoding a video includes a historical encoding data acquisition module 501, a desired encoding data calculation module 502 and a quantization parameter adjustment module 503.

The historical encoding data acquisition module 501 is configured to acquire an actual encoding data amount and an encoding frame number of an encoder in a historical time period.

The desired encoding data calculation module 502 is configured to calculate a desired encoding data amount in the historical time period according to a code rate of the encoder and the encoding frame number.

The quantization parameter adjustment module 503 is configured to compare the actual encoding data amount with the desired encoding data amount, and adjust a quantization parameter of the encoder according to a comparison result to instruct the encoder to continue encoding using the adjusted quantization parameter.

According to the solution of the present disclosure, the quantization parameter of the encoder is adjusted according to the actual encoding data amount, the encoding frame number and the code rate of the encoder in the historical time period to control the encoding data amount of video frames, thereby keeping the encoding data amount and the code rate constant, improving the stability of the bandwidth occupied for video encoding and improving the traffic stability of video encoding. Moreover, the quantization parameter is adjusted in real time in the encoding process, thereby improving the stability of video encoding, reducing the labor cost and improving the efficiency of controlling constancy of the rate.

In an embodiment, the quantization parameter adjustment module 503 includes: an adjustment value calculation unit, which is configured to calculate a difference between the actual encoding data amount and the desired encoding data amount, and determine an adjustment value; an adjustment symbol determination unit, which is configured to determine a symbol of the adjustment value according to a numerical comparison relationship between the actual encoding data amount and the desired encoding data amount; and a quantization parameter adjustment unit, which is configured to adjust the quantization parameter of the encoder according to the adjustment value and the symbol of the adjustment value.

In an embodiment, the adjustment value calculation unit includes: a ratio calculation sub-unit, which is configured to calculate a first ratio between the difference and the desired encoding data amount; an integer calculation sub-unit, which is configured to calculate a second ratio between the first ratio and a preset standard divisor and round the second ratio to obtain a target integer; and an adjustment value determination sub-unit, which is configured to determine the adjustment value according to the target integer.

In an embodiment, the adjustment value determination sub-unit includes: an adjustment coefficient calculation sub-unit, which is configured to compare the first ratio with a preset standard ratio, and determine a corresponding adjustment coefficient; and a target integer adjustment sub-unit, which is configured to determine the adjustment value according to the adjustment coefficient and the target integer.

In an embodiment, the desired encoding data calculation module 502 includes: a total desired encoding data amount calculation unit, which is configured to calculate a total desired encoding data amount in the historical time period according to the code rate of the encoder; and a desired encoding data amount determination unit, which is configured to calculate a data amount of one video frame in the historical time period according to the total desired encoding data amount and the encoding frame number, and determine the data amount as the desired encoding data amount.

In an embodiment, the historical encoding data acquisition module 501 includes: a video stream historical encoding data acquisition module, which is configured to acquire an actual encoding data amount of the encoder for a video stream in the historical time period.

Optionally, the data amount is the frame size.

The preceding apparatus for encoding a video may perform the method for encoding a video provided by any embodiment of the present disclosure and has function modules and beneficial effects corresponding to the performed method for encoding a video.

In the solution of the present disclosure, acquisition, storage and application of user personal information or vehicle information involved herein are in compliance with relevant laws and regulations and do not violate the public order and good customs.

According to an embodiment of the present disclosure, the present disclosure further provides an electronic device, a readable storage medium and a computer program product.

Figure 6:
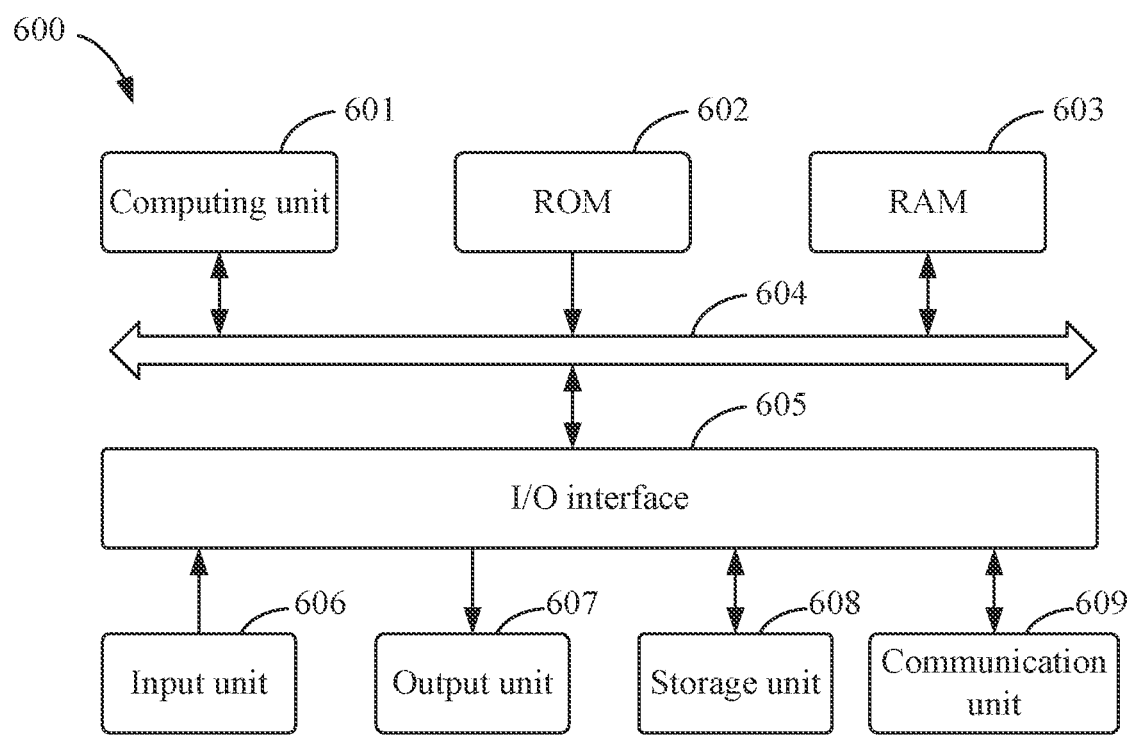
FIG. 6 is a block diagram of an electronic device for implementing a method for encoding a video according to an embodiment of the present disclosure.

FIG. 6 is a block diagram of an example electronic device 600 for implementing the embodiments of the present disclosure. The electronic device is intended to represent various forms of digital computer, for example, a laptop computer, a desktop computer, a worktable, a personal digital assistant, a server, a blade server, a mainframe computer or another applicable computer. The electronic device may also represent various forms of mobile device, for example, a personal digital assistant, a cellphone, a smartphone, a wearable device or another similar computing device. Herein the shown components, the connections and relationships between these components, and the functions of these components are illustrative only and are not intended to limit the implementation of the present disclosure as described and/or claimed herein.

As shown in FIG. 6, the device 600 includes a computing unit 601. The computing unit 601 may perform various types of appropriate operations and processing based on a computer program stored in a read-only memory (ROM) 602 or a computer program loaded from a storage unit 608 to a random-access memory (RAM) 603. Various programs and data required for operations of the device 600 may also be stored in the RAM 603. The computing unit 601, the ROM 602 and the RAM 603 are connected to each other via a bus 604. An input/output (I/O) interface 605 is also connected to the bus 604.

Multiple components in the device 600 are connected to the I/O interface 605. The multiple components include an input unit 606 such as a keyboard and a mouse, an output unit 607 such as various types of displays and speakers, the storage unit 608 such as a magnetic disk and an optical disk, and a communication unit 609 such as a network card, a modem and a wireless communication transceiver. The communication unit 609 allows the device 600 to exchange information/data with other devices over a computer network such as the Internet and/or various telecommunications networks.

The computing unit 601 may be various general-purpose and/or special-purpose processing components having processing and computing capabilities. Some examples of the computing unit 601 include, but are not limited to, central processing units (CPUs), graphics processing units (GPUs), various special-purpose artificial intelligence (AI) computing chips, various computing units running machine learning models and algorithms, digital signal processors (DSPs), and any suitable processors, controllers and microcontrollers. The computing unit 601 performs various methods and processing described above, such as the method for encoding a video. For example, in some embodiments, the method for encoding a video may be implemented as a computer software program tangibly contained in a machine-readable medium such as the storage unit 608. In some embodiments, part or all of a computer program may be loaded and/or installed on the device 600 via the ROM 602 and/or the communication unit 609. When the computer program is loaded to the RAM 603 and executed by the computing unit 601, one or more steps of the preceding method for encoding a video may be executed. Alternatively, in other embodiments, the computing unit 601 may be configured, in any other suitable manner (for example, by means of firmware), to perform the method for encoding a video.

Herein various embodiments of the systems and techniques described above may be implemented in digital electronic circuitry, integrated circuitry, field-programmable gate arrays (FPGAs), application-specific integrated circuits (ASICs), application-specific standard products (ASSPs), systems on a chip (SoCs), complex programmable logic devices (CPLDs), computer hardware, firmware, software and/or combinations thereof. The embodiments may include implementations in one or more computer programs. The one or more computer programs are executable, interpretable, or executable and interpretable on a programmable system including at least one programmable processor. The programmable processor may be a dedicated or general-purpose programmable processor for receiving data and instructions from a memory system, at least one input device and at least one output device and transmitting the data and instructions to the memory system, the at least one input device and the at least one output device.

Program codes for implementing the methods of the present disclosure may be compiled in any combination of one or more programming languages. These program codes may be provided for a processor or controller of a general-purpose computer, a special-purpose computer or another programmable data processing device such that the program codes, when executed by the processor or controller, cause functions/operations specified in the flowcharts and/or block diagrams to be implemented. The program codes may be executed in whole on a machine, executed in part on a machine, executed, as a stand-alone software package, in part on a machine and in part on a remote machine, or executed in whole on a remote machine or a server.

In the context of the present disclosure, the machine-readable medium may be a tangible medium that may include or store a program that is used by or used in conjunction with a system, apparatus or device that executes instructions. The machine-readable medium may be a machine-readable signal medium or a machine-readable storage medium. The machine-readable medium may include, but are not limited to, electronic, magnetic, optical, electromagnetic, infrared or semiconductor systems, apparatuses or devices or any suitable combinations thereof. More specific examples of the machine-readable storage medium may include an electrical connection based on one or more wires, a portable computer disk, a hard disk, a random-access memory (RAM), a read-only memory (ROM), an erasable programmable read-only memory (EPROM), a flash memory, an optical fiber, a portable compact disk read-only memory (CD-ROM), an optical memory device, a magnetic memory device or any suitable combination thereof.

In order to provide the interaction with a user, the systems and techniques described herein may be implemented on a computer. The computer has a display device (for example, a cathode-ray tube (CRT) or a liquid-crystal display (LCD) monitor) for displaying information to the user and a keyboard and a pointing device (for example, a mouse or a trackball) through which the user can provide input to the computer. Other types of devices may also be used for providing interaction with a user. For example, feedback provided for the user can be sensory feedback in any form (for example, visual feedback, auditory feedback or haptic feedback). Moreover, input from the user can be received in any form (including acoustic input, voice input or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein) or a computing system including any combination of such back-end, middleware or front-end components. Components of a system may be interconnected by any form or medium of digital data communication (for example, a communication network). Examples of the communication network include a local area network (LAN), a wide area network (WAN) and the Internet.

The computing system may include clients and servers. A client and a server are generally remote from each other and typically interact through a communication network. The relationship between the client and the server arises by virtue of computer programs running on respective computers and having a client-server relationship to each other. The server may be a cloud server and may also be a server of a distributed system or a server combined with blockchain.

It is to be understood that various forms of the preceding flows may be used, with steps reordered, added or removed. For example, the steps described in the present disclosure may be executed in parallel, in sequence or in a different order as long as the desired result of the technical solution disclosed in the present disclosure is achieved. The execution sequence of these steps is not limited herein.

The scope of the present disclosure is not limited to the preceding embodiments. It is to be understood by those skilled in the art that various modifications, combinations, subcombinations and substitutions may be made depending on design requirements and other factors. Any modifications, equivalent substitutions, improvements and the like made within the spirit and principle of the present disclosure is within the scope of the present disclosure.

What is claimed is:

1. A method for encoding a video, comprising:
    acquiring an actual encoding data amount and an encoding frame number of an encoder in a historical time period;
    calculating a desired encoding data amount in the historical time period according to a code rate of the encoder and the encoding frame number; and
    comparing the actual encoding data amount with the desired encoding data amount, and adjusting a quantization parameter of the encoder according to a comparison result to instruct the encoder to continue encoding using the adjusted quantization parameter-;
    wherein comparing the actual encoding data amount with the desired encoding data amount, and adjusting the quantization parameter of the encoder according to the comparison result comprises:
    calculating a difference between the actual encoding data amount and the desired encoding data amount, and determining an adjustment value;
    determining a symbol of the adjustment value according to a numerical comparison relationship between the actual encoding data amount and the desired encoding data amount; and
    adjusting the quantization parameter of the encoder according to the adjustment value and the symbol of the adjustment value; and
    wherein determining the adjustment value comprises:
    calculating a first ratio between the difference and the desired encoding data amount:
    calculating a second ratio between the first ratio and a preset standard divisor and rounding the second ratio to obtain a target integer; and
    determining the adjustment value according to the target integer.

2. The method according to claim 1, wherein determining the adjustment value according to the target integer comprises:
    comparing the first ratio with a preset standard ratio, and determining a corresponding adjustment coefficient; and
    determining the adjustment value according to the adjustment coefficient and the target integer.

3. The method according to claim 1, wherein calculating the desired encoding data amount in the historical time period according to the code rate of the encoder and the encoding frame number comprises:
    calculating a total desired encoding data amount in the historical time period according to the code rate of the encoder; and
    calculating a data amount of one video frame in the historical time period according to the total desired encoding data amount and the encoding frame number, and determining the data amount as the desired encoding data amount.

4. The method according to claim 1, wherein acquiring the actual encoding data amount of the encoder in the historical time period comprises:
    acquiring an actual encoding data amount of the encoder for a video stream in the historical time period.

5. The method according to claim 1, wherein the data amount is a frame size.

6. An apparatus for encoding a video, comprising: at least one processor; and a memory communicatively connected to the at least one processor; wherein the memory stores instructions executable by the at least one processor, and the instructions are executed by the at least one processor to cause the at least one processor to perform steps in the following modules:
    a historical encoding data acquisition module, which is configured to acquire an actual encoding data amount and an encoding frame number of an encoder in a historical time period;
    a desired encoding data calculation module, which is configured to calculate a desired encoding data amount in the historical time period according to a code rate of the encoder and the encoding frame number; and
    a quantization parameter adjustment module, which is configured to compare the actual encoding data amount with the desired encoding data amount, and adjust a quantization parameter of the encoder according to a comparison result to instruct the encoder to continue encoding using the adjusted quantization parameter;
    wherein the quantization parameter adjustment module comprises:
    an adjustment value calculation unit, which is configured to calculate a difference between the actual encoding data amount and the desired encoding data amount, and determine an adjustment value;
    an adjustment symbol determination unit, which is configured to determine a symbol of the adjustment value according to a numerical comparison relationship between the actual encoding data amount and the desired encoding data amount; and
    a quantization parameter adjustment unit, which is configured to adjust the quantization parameter of the encoder according to the adjustment value and the symbol of the adjustment value; and
    wherein the adjustment value calculation unit comprises:
    a ratio calculation sub-unit, which is configured to calculate a first ratio between the difference and the desired encoding data amount;
    an integer calculation sub-unit, which is configured to calculate a second ratio between the first ratio and a preset standard divisor and round the second ratio to obtain a target integer; and
    an adjustment value determination sub-unit, which is configured to determine the adjustment value according to the target integer.

7. The apparatus according to claim 6, wherein the adjustment value determination sub-unit comprises:

an adjustment coefficient calculation sub-unit, which is configured to compare the first ratio with a preset standard ratio, and determine a corresponding adjustment coefficient; and a target integer adjustment sub-unit, which is configured to determine the adjustment value according to the adjustment coefficient and the target integer.

8. The apparatus according to claim 6, wherein the desired encoding data calculation module comprises:

a total desired encoding data amount calculation unit, which is configured to calculate a total desired encoding data amount in the historical time period according to the code rate of the encoder; and a desired encoding data amount determination unit, which is configured to calculate a data amount of one video frame in the historical time period according to the total desired encoding data amount and the encoding frame number, and determine the data amount as the desired encoding data amount.

9. The apparatus according to claim 6, wherein the historical encoding data acquisition module comprises:

a video stream historical encoding data acquisition module, which is configured to acquire an actual encoding data amount of the encoder for a video stream in the historical time period.

10. The apparatus according to claim 6, wherein the data amount is a frame size.

11. A non-transitory computer-readable storage medium storing a computer instruction, wherein the computer instruction is used for enabling a computer to perform the following steps:

acquiring an actual encoding data amount and an encoding frame number of an encoder in a historical time period;

calculating a desired encoding data amount in the historical time period according to a code rate of the encoder and the encoding frame number; and comparing the actual encoding data amount with the desired encoding data amount, and adjusting a quantization parameter of the encoder according to a comparison result to instruct the encoder to continue encoding using the adjusted quantization parameter-;

wherein comparing the actual encoding data amount with the desired encoding data amount, and adjusting the quantization parameter of the encoder according to the comparison result comprises:

calculating a difference between the actual encoding data amount and the desired encoding data amount, and determining an adjustment value;

determining a symbol of the adjustment value according to a numerical comparison relationship between the actual encoding data amount and the desired encoding data amount; and adjusting the quantization parameter of the encoder according to the adjustment value and the symbol of the adjustment value;

wherein determining the adjustment value comprises:

calculating a first ratio between the difference and the desired encoding data amount;

calculating a second ratio between the first ratio and a preset standard divisor and rounding the second ratio to obtain a target integer; and determining the adjustment value according to the target integer.

12. The storage medium according to claim 11, wherein determining the adjustment value according to the target integer comprises:

comparing the first ratio with a preset standard ratio, and determining a corresponding adjustment coefficient; and determining the adjustment value according to the adjustment coefficient and the target integer.

13. The storage medium according to claim 11, wherein calculating the desired encoding data amount in the historical time period according to the code rate of the encoder and the encoding frame number comprises:

calculating a total desired encoding data amount in the historical time period according to the code rate of the encoder; and calculating a data amount of one video frame in the historical time period according to the total desired encoding data amount and the encoding frame number, and determining the data amount as the desired encoding data amount.

14. The storage medium according to claim 11, wherein acquiring the actual encoding data amount of the encoder in the historical time period comprises:

acquiring an actual encoding data amount of the encoder for a video stream in the historical time period.

* * * * *